United States Patent [19]

Roesler

[11] E Patent Number: Re. 33,708

[45] Reissued Date of Patent: Oct. 8, 1991

[54] SURVEYING OF BOREHOLES USING SHORTENED NON-MAGNETIC COLLARS

[75] Inventor: Richard F. Roesler, Houston, Tex.

[73] Assignee: Baroid Technology, Inc., Houston, Tex.

[21] Appl. No.: 617,410

[22] Filed: Nov. 21, 1990

Related U.S. Patent Documents

Reissue of:

[64] Patent No.: 4,510,696
Issued: Apr. 16, 1985
Appl. No.: 515,716
Filed: Jul. 20, 1983

U.S. Applications:

[63] Continuation of Ser. No. 892,502, Aug. 1, 1986, abandoned.

[51] Int. Cl.[5] ..... E21B 47/022
[52] U.S. Cl. ..... 33/304; 33/313
[58] Field of Search ..... 33/313, 304, 312, 303, 33/302

[56] References Cited

U.S. PATENT DOCUMENTS

| | | | |
|---|---|---|---|
| 3,862,499 | 1/1975 | Isham et al. | 33/302 |
| 3,935,642 | 2/1976 | Russell | 33/312 |
| 4,021,774 | 5/1977 | Asmundsson et al. | 33/313 |
| 4,071,959 | 2/1978 | Russell et al. | 33/313 |
| 4,083,117 | 4/1978 | Russell et al. | 33/313 |
| 4,163,324 | 8/1979 | Russell et al. | 33/313 |
| 4,199,869 | 4/1980 | Van Steenwyk | 33/304 |

FOREIGN PATENT DOCUMENTS 1578053 2/1978 United Kingdom .

OTHER PUBLICATIONS

"Composite Catalog of Oil Field Equipment & Services", vol. 3—31st Revision, 1974–1975, p. 1825.

Answer and Counterclaims by Drexel Instruments, Inc. and Sharewell, Inc. to Plaintiff's Second Amended Complaint.

Answer by Drexel Equipment (U.K.) Ltd. to Plaintiff's Second Amended Complaint.

*Encyclopedia Britannica*, vol. 10, Game Birds to Gun Metal, p. 171, published 1960.

"Magnetic Compasses and Magnetometers" by Alfred Hine; pp. 1–7 and 105–107, published 1968, London.

"Magnetic Well Surveying Compasses" (six pages), Sperry-Sun Well Surveying Company dated 12-15-56.

Smith International, "Non-Magnetic Collar Length Selection Chart" (two pages), dated 1976.

(List continued on next page.)

*Primary Examiner*—Willis Little

[57] ABSTRACT

[When surveying a borehole using an instrument responsive to the earth's magnetic field, a length of non-magnetic drill collar is necessary to house means for measuring the magnetic field in the borehole perpendicular to the direction of the borehole axis. The instrument determines the inclination angle and the highside angle from the gravitation measurements, with these measurements and the magnetic measurements, the azimuth angle is determined. Using the method of this invention a minimum length of non-magnetic material necessary for an accurate measurement may be calculated and used.] *Disclosed are method and apparatus for surveying a borehole including use of a survey instrument for making gravitational measurements from which the inclination and highside angles of the instrument may be determined. Measurements of two components of the local magnetic field perpendicular to the longitudinal axis of the instrument may be sensed with the instrument, and may be used to determine the azimuth angle of the instrument under the assumption that magnetic interference due to the pipe string in which the instrument is located lies solely along the longitudinal axis of the instrument. The accuracy of the azimuth determination may be enhanced by an iteration process. To the extent that the pipe string interference includes transverse field components at the instrument, the sensors of the instrument may be separated from such pipe string members by placing the instrument in non-magnetic material whose minimum length may be determined.*

24 Claims, 5 Drawing Sheets

OTHER PUBLICATIONS

"Determining Downhole Magnetic Interference on Directional Surveys" by A. C. Scott et al., SPE 7748, 1979 (six pages).

"Borehole Position Uncertainty–Analysis of Measuring Methods and Derivation of Systematic Error Model" by Wolff et al, pp. 2339–2350; 1981, Society of Petroleum Engineers of AIME.

"Magnetic Properties of Nonmagnetic Drill Collars and Their Relation to Survey Compass Error" by Edward et al, pp. 229–241; *Geoexploration*, 17 (1979).

"Determining Nonmagnetic Survey Collar Requirements", World Oil, May 1976, vol. 182, No. 6, pp. 79, 80.

Sperry-Sun, "Guide for Selecting Non-Magnetic Drill Collars" (two pages).

SURVEYING OF BOREHOLES USING SHORTENED NON-MAGNETIC COLLARS

Matter enclosed in heavy brackets [ ] appears in the original patent but forms no part of this reissue specification; matter printed in italics indicates the additions made by reissue.

*This is a continuation of co-pending application Ser. No. 06/892,502 filed on Aug. 1, 1986, now abandoned; which is a reissue of Ser. No. 06/516,716 filed Jul. 20, 1983, now U.S. Pat. No. 4,510,696.*

This invention relates to the surveying of boreholes and to the use of a shorter nonmagnetic drill collar for housing the surveying instrumentation. It is particularly concerned with the determination of the azimuth angle of a borehole using a shorter nonmagnetic drill collar.

At present "pivoted compass" single shot and multi-shot instruments are used for determination of azimuth angle. However, with such instruments, the necessary correction to compensate for the modification of the earth's magnetic field in the vicinity of the instruments can only be performed by assuming the size and direction of the error field caused by the instrument, requiring a knowledge of the magnetic moment of the compass magnet and using instrumentation located in a nonmagnetic drill collar having a minimum length of 30 feet and in some areas of the world, as much as 120 feet. The procedure for determination of the azimuth angle is necessarily empirical and use of the lengthy nonmagnetic collar is troublesome.

In Russell et al., U.S. Pat. No. 4,163,324, there is disclosed a method for determination of the azimuth angle of a borehole in which it is assumed that the error vector which modifies the earth's magnetic vector at the instrument is in the direction of the borehole at the survey location. The instrument can be mounted in a nonmagnetic housing in the form of a drill collar with the other components of the drill string above and below the instrument being typically constructed of magnetic materials. The effect of this assumption is that the magnitude of the error vector can be determined from the difference between the true and apparent values of the components of the earth's magnetic field in a single direction which is not perpendicular to the axis of the borehole.

In the method of Russell et al. for determining the orientation of the surveying instrument in the borehole, the steps include determining the inclination angle of the instrument at the location thereof in the borehole, sensing, at said location, at least one vector component of the local magnetic field to determine the local magnetic field in the direction of a primary axis of the instrument aligned with the borehole, determining the azimuth angle of the instrument relative to the apparent magnetic north direction at said location, ascertaining the true horizontal and vertical components of the earth's magnetic field at the location of the borehole and determining the correction to be applied to the apparent azimuth angle from the true and apparent values for the horizontal and vertical components of the earth's magnetic field.

According to the invention of this Application, there is provided an improved method for determining the orientation of a surveying instrument in a borehole including the steps of determining the inclination angle [of the instrument at the location in the borehole, determining the high side angle of the instrument at the location, determining the true horizontal and vertical components of the earth's magnetic field at the location, determining the components of the local magnetic field perpendicular to the longitudinal axis of the instrument at the location, determining the azimuth angle for the instrument relative to the apparent magnetic north direction at the location.] *and the highside angle of the instrument in the borehole, determining two transverse components of the local magnetic field perpendicular to the longitudinal axis of the instrument in the borehole, determining a value for the component of the local magnetic field along the longitudinal axis of the instrument, and determining a value of azimuth angle utilizing the local magnetic field components, the inclination angle and the highside angle. The step of determining the component of the local magnetic field along the longitudinal axis of the instrument may be accomplished by utilizing the inclination angle and data indicative of the earth's magnetic field at the borehole. An approximate value of the azimuth angle may also be utilized in determining a value for the component of the local magnetic field along the longitudinal axis of the instrument, which may then be used to determine a more accurate value for the azimuth angle. Such an iteration process may be carried out until the obtained values of azimuth angle converge to within an acceptable error.*

The inclination and highside angle are preferably determined by measuring the gravity vector at the instrument. This may be done using three accelerometers which are preferably orthogonal to one another and are conveniently arranged such that two of them sense the components of gravity in the two directions that the fluxgates sense the components of the local magnetic field.

[In another embodiment of this application, a system positioned in a drill collar is disclosed for determining the orientation of a downhole instrument in a borehole comprising: means for determining inclination angle of the instrument at a location in the borehole; means for determining the highside angle of the instrument at the location; means for determining the true horizontal and vertical components of the earth's magnetic field at the borehole; means for determining two components of the local magnetic field perpendicular to the direction of the longitudinal axis of the instrument at the location, means for determining the azimuth angle of the instrument relative to magnetic north direction at the location, the drill collar being constructed of nonmagnetic material, and having a minimum length, L, which is determined by:

$$L = 2\left[\frac{|P_U| + |P_L|\ 2d}{4\pi\ B_n\ \delta\omega}\right]^{\frac{1}{2}}$$ ]

*A survey instrument according to the present invention, including means for determining the inclination angle and highside angle of the instrument and means for determining components of the local magnetic field perpendicular to the direction of the longitudinal axis of the instrument, may be positioned within a pipe string in a borehole and utilized to determine the orientation of the instrument within the borehole by being placed within non-magnetic material in the pipe string to allow for magnetic field measurements. The non-magnetic material may be extended to a determinable length to separate the survey instrument from magnetic material in the pipe string for the purpose of*

*avoiding magnetic field components transverse to the longitudinal axis of the instrument due to magnetic interference from pipe string members.*

The determination of the azimuth angle of an instrument in a borehole, in accordance with the invention, will now be described in more detail with reference to the accompanying drawings in which.

Figure 1:
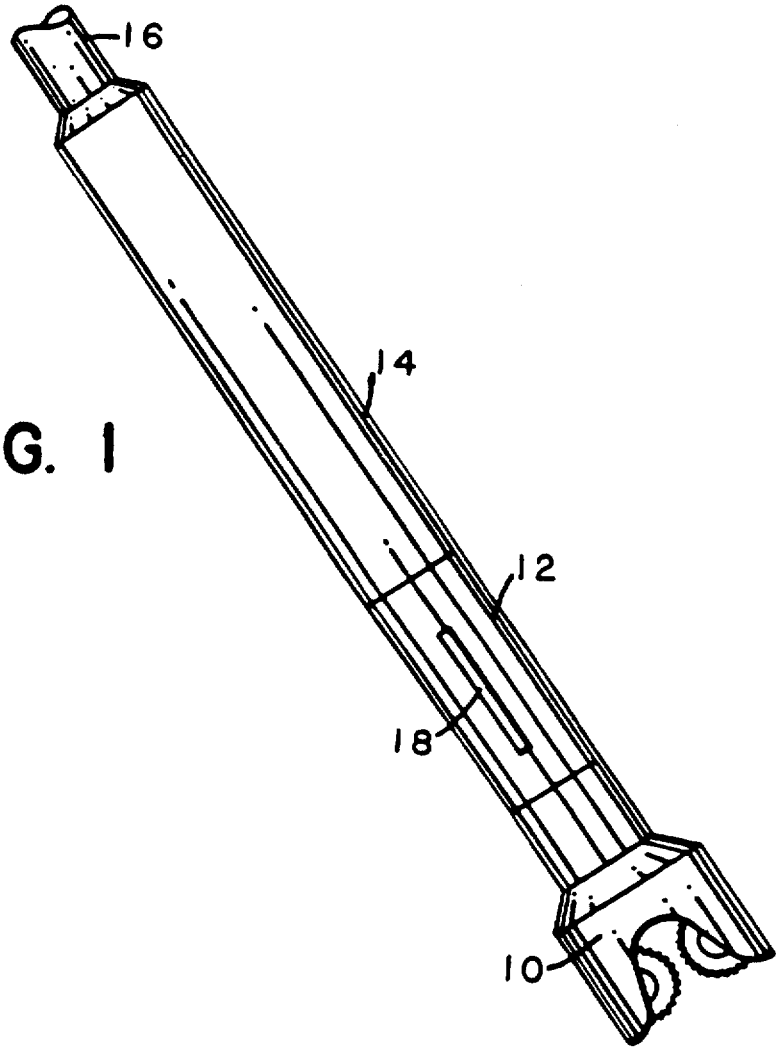
FIG. 1 is a schematic elevational view of a drill string incorporating a survey instrument in accordance with the invention.
Figure 6:
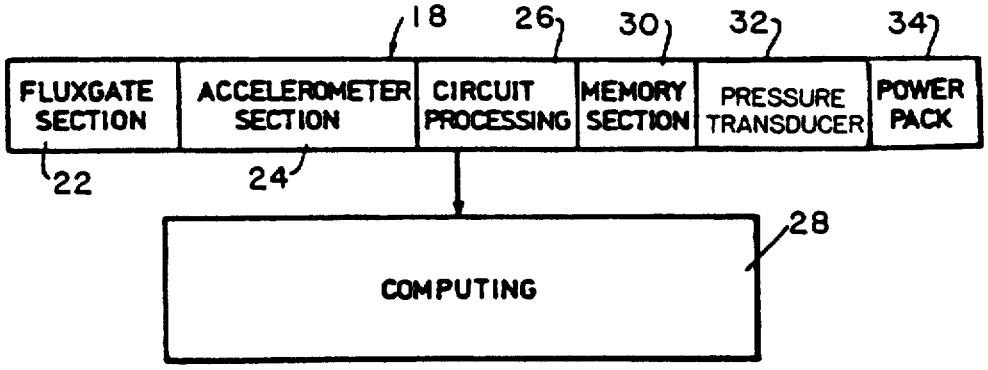
FIG. 6 is a block schematic diagram illustrating the instrument shown in FIG. 1.

Referring to FIG. 1, a drill string comprises a drilling bit 10 which is coupled by a nonmagnetic drill collar 12 and a set of drill collars 14, which may be made of magnetic material, to a drill string or pipe 16. The nonmagnetic drill collar 12 [of a predetermined length] contains a survey instrument 18 in accordance with the invention. As shown in FIG. 6, the survey instrument 18 comprises a fluxgate section 22 and an accelerometer section 24. The accelerometer section 24 comprises three accelerometers arranged to sense components of gravity in three mutually orthogonal directions, [once] *one* of which is preferably coincident with the longitudinal axis of the drill string. The fluxgate section 22 comprises two fluxgates arranged to measure magnetic field strength in two of the three mutually orthogonal directions namely along axes OX and OY as will be described with reference to FIG. 2. Additionally, the survey instrument comprises associated signal processing apparatus as will be described hereinafter with reference to FIG. 6.

The instrument sensors measure local field components within a "nonmagnetic" drill collar 12 which is itself part of the drill string, the collar being located close to the drilling bit 10. The outputs from the two mutually orthogonal fluxgates comprise the components $B_x$ and $B_y$ of the local magnetic field along the axes OX and OY respectively. The outputs from the three accelerometers in the accelerometer section 24 comprise the components $g_x$, $g_y$, and $g_z$ of the local gravitation field along the axes OX, OY and OZ.

The five output components $g_x, g_y, g_z$, $B_x$[, ] and $B_y$ [and By] are in the form of proportional voltages which are applied to a circuit processing unit 26 comprising analog to digital converters. The outputs $g_x, g_y$, and $g_z$ from the analog to digital converters in the circuit processing unit 26 are ultimately processed through a digital computing unit 28 to yield values of highside angle $\phi$ and inclination $\theta$. This computing operation may be performed within the survey instrument and the computed values stored in a memory section 30 which preferably comprises one or more solid-state memory packages. However, instead of storing four values $\phi$, $\theta$, $B_x$ and $B_y$ it will usually be more convenient to provide the memory section 30 with sufficient capacity to store the five outputs from the analog to digital converters in the circuit processing unit 26 and to provide the computing unit 28 in the form of a separate piece of apparatus to which the instrument is connected after extraction from the borehole. Alternatively, the values may be directly transferred to the surface units via conventional telemetry means (not shown).

The instrument 18 may also comprise a pressure transducer 32 arranged to detect the cessation of pumping of drilling fluids through the drill string, this being indicative that the survey instrument is stationary. The measurements are preferably made when the instrument is stationary. Other means of detecting the nonmovement of the instrument may be used such as motion sensors.

Power for the instrument may be supplied by a battery power pack 34, downhole power generator or power line connected with a surface power supply unit.

The preferred form of the invention, using two fluxgates and three accelerometers as described above, has the advantage of not requiring any accurately pivoted components, the only moving parts being the proof masses of the accelerometers.

Figure 2:
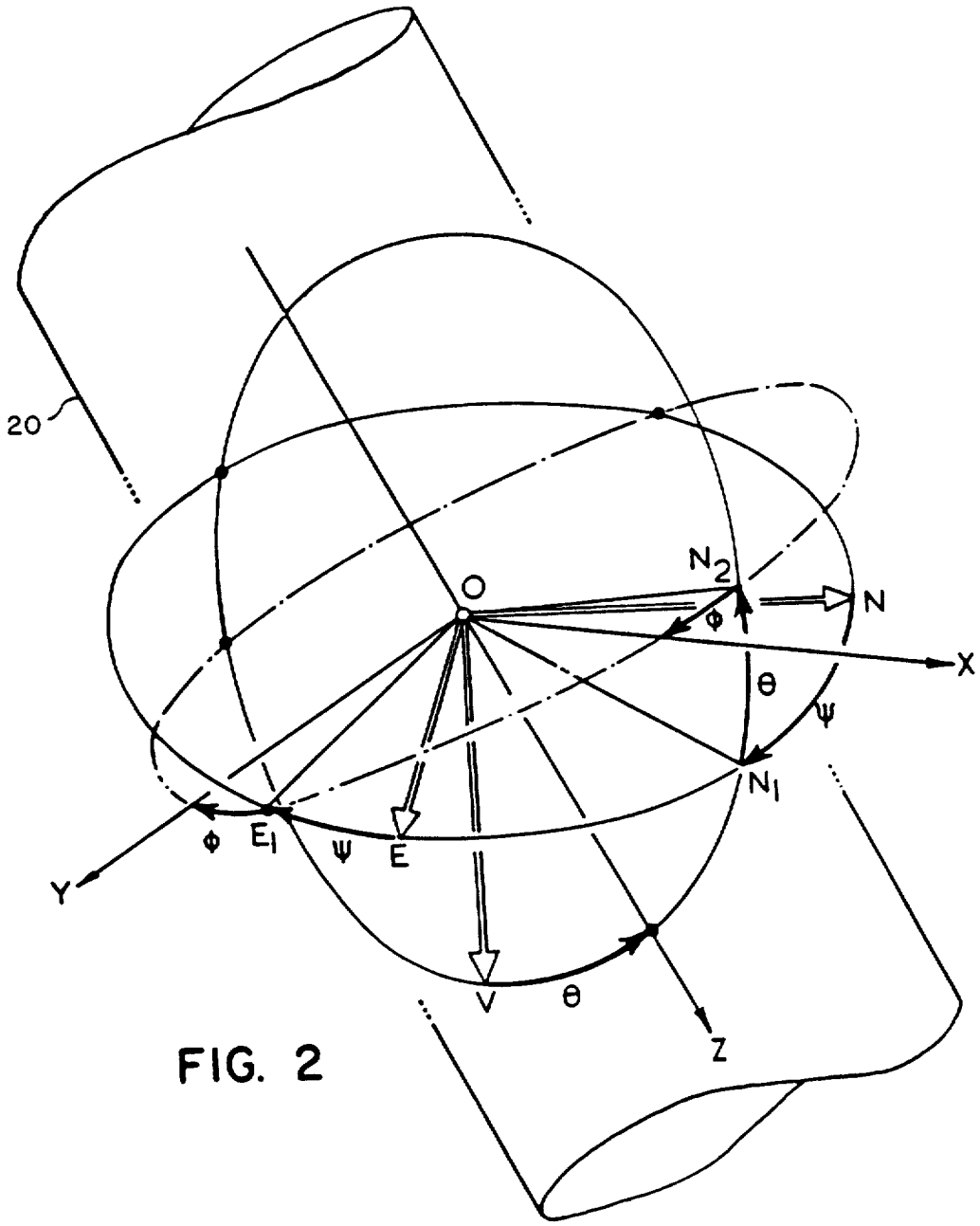
FIG. 2 is a schematic perspective view illustrating a transformation between earth-fixed axes and instrument-fixed axes.

FIG. 2 shows a borehole 20 and illustrates various reference axes relative to which the orientation of the borehole 20 may be defined. A set of earth-fixed axes (ON, OE and OV) are illustrated with OV being vertically down and ON being a horizontal reference position. A corresponding instrument-case-fixed set of axes OX, OY and OZ are illustrated where OZ is the longitudinal axis of the borehole (and therefore of the instrument case) and OX and OY, which are in a plane perpendicular to the borehole axis represented by a chain-dotted line, are the two above-mentioned directions in which the accelerometers and fluxgates are oriented.

Figure 3:
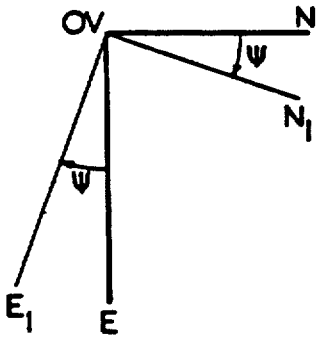
FIGS. 3 to 5 are diagrams illustrating, in two dimensions, the various stages of the transformation shown in FIG. 2.
Figure 4:
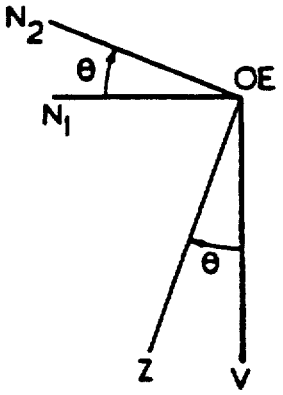
Figure 5:
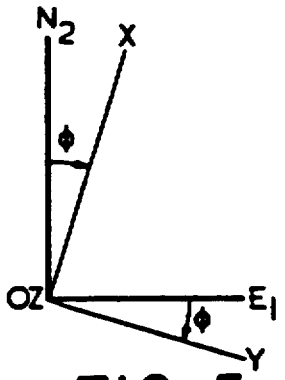

A spatial survey of the path of a borehole is usually derived from a series of measurements of an azimuth angle $\psi$ and an inclination angle $\theta$. Measurements of ($\theta$, $\psi$) are made at successive stations along the path, and the distance between these stations is accurately known. The set of case-fixed orthogonal axes OX, OY and OZ are related to an earth-fixed set of axes ON, OE and OV through a set of angular rotations ($\psi$, $\theta$, $\phi$). Specifically, the earth-fixed set of axes (ON, OE, OV) rotates into the case-filled set of axes (OX, OY, OZ) via three successive clockwise rotations; through the azimuth angle $\psi$ about OV shown in FIG. 3; through the inclination angle $\theta$, about OE shown in FIG. 4; and through the highside angle $\phi$, about OZ shown in FIG. 5. [In] *If* $U_N$, $U_E$ and $U_V$ are unit vectors in the ON, OE and OV directions respectively, then the vector operation equation is:

$$U_{NEV}=[\psi][\theta][\phi]U_{XYZ} \tag{1}$$

which represents the transformation between unit vectors in the two frames of reference (ONEV) and OXYZ) where:

$$[[\psi] = \begin{matrix} \cos\psi & -\sin\psi & 0 \\ \sin\psi & \cos\psi & 0 \\ 0 & 0 & 1 \end{matrix} \tag{2}$$

$$[\theta] = \begin{matrix} \cos\theta & 0 & \sin\theta \\ 0 & 1 & 0 \\ -\sin\theta & 0 & \cos\theta \end{matrix} \tag{3}$$

-continued $$[\phi] = \begin{matrix} \cos\phi & -\sin\phi & 0 \\ \sin\phi & \cos\phi & 0 \\ 0 & 0 & 1 \end{matrix} \quad (4)]$$

$$[\psi] = \begin{bmatrix} \cos\psi & -\sin\psi & 0 \\ \sin\psi & \cos\psi & 0 \\ 0 & 0 & 1 \end{bmatrix} \quad (2)$$

$$[\theta] = \begin{bmatrix} \cos\theta & 0 & \sin\theta \\ 0 & 1 & 0 \\ -\sin\theta & 0 & \cos\theta \end{bmatrix} \quad (3)$$

$$[\phi] = \begin{bmatrix} \cos\phi & -\sin\phi & 0 \\ \sin\phi & \cos\phi & 0 \\ 0 & 0 & 1 \end{bmatrix} \quad (4)$$

The vector operation equation for a transformation in the reverse direction can be written as, $$[U_{XYZ}=(\phi)^T(\theta)^T(\psi)^T U_{NEV}]$$

$$U_{XYZ}=[\phi]^T[\theta]^T[\psi]^T U_{NEV} \quad (5)$$

The computing operation performed by the computing unit 28 will now be described. The first stage is to calculate the inclination angle $\theta$ and the highside angle $\phi$. Use of the vector operation equation 5 to operate on the gravity vector;

$$\begin{bmatrix} 0 \\ 0 \\ g \end{bmatrix} \quad (6)$$

yields gravity components in the OXYZ frame $$g_x = -g \sin\theta \cos\phi \quad (7)$$

$$g_y = g \sin\theta \sin\phi \quad (8)$$

$$g_z = g \cos\theta \quad (9)$$

Thus, the highside angle $\phi$ can be determined from $$\tan\phi = -[g_y/g_x] \quad (10)$$

*and the inclination angle from*

$$\tan\theta = \frac{(g_x^2 + g_y^2)^{\frac{1}{2}}}{g_z} \quad (10a)$$

The next step is to obtain the value of $B_n$ and $B_v$, the true horizontal and vertical components of the earth's magnetic field, respectively, from published geomagnetic survey data *or otherwise*. [If geomagnetic survey data is not available, the probe itself] *The probe itself, or a similar sensor with at least one fluxgate or the like,* may be used to measure $B_n$ and $B_v$ the measurement being made at a location close to the top of the borehole but sufficiently remote from any ferromagnetic structure which may cause the true earth's magnetic field to be modified. *By "true" is meant magnetic measurements not influenced by magnetic material of the drill string.*

*It will be appreciated that any data indicative of the earth's magnetic field may be determined. For example, the combination of the total magnetic field strength and the field dip angle is equivalent to the combination of the north and vertical components of the field (the east component is always zero). The present calculations to obtain a correct azimuth may be effected in terms of any equivalent field data. Also, where the survey instrument or other sensor is used to determine "true" field data, the measurements need not be absolute, that is, the fluxgates need only be calibrated relative to each other.*

The azimuth angle, $\psi$, is calculated using an [iteration loop] *iterative procedure in which* the input values [being] *are* the highside angle $\phi$, inclination angle $\theta$, and the magnetic field components $B_x$, $B_y$, $B_v$ and $B_n$. The initial value of azimuth angle, [$\theta$o] $\psi_o$, is calculated from $$[\tan\psi o = \frac{-(B_x \sin\phi + B_y \cos\phi)\cos\theta}{(B_x \cos\phi - B_y \sin\phi) + B_v \sin\theta} \quad (11)]$$

$$\tan\psi_o = \frac{-(B_x \sin\phi + B_y \cos\phi)\cos\theta}{(B_x \cos\phi - B_y \sin\phi) + B_v \sin\theta} \quad (11)$$

Successive values of azimuth angle, [$\psi$n] $\psi_n$, may be used to determine $B_z$ by equation:

$$B_x = B_n \cos\psi_n \sin\theta + B_v \cos\theta \quad (12)$$

Using $B_z$, the azimuth angle, $\psi$, may be determined using the equation $$[\tan\psi\, n + 1 = \frac{(B_x \sin\phi + B_y \cos\phi)}{\cos\theta\,(B_x \cos\phi - B_y \sin\phi) + B_z \sin\theta} \quad (13)]$$

$$\tan\psi_{n+1} = \frac{-(B_x \sin\phi + B_y \cos\phi)}{\cos\theta\,(B_x \cos\phi - B_y \sin\phi) + B_z \sin\theta} \quad (13)$$

Equations (12) and (13) are convenient to mechanize in a computing step until $(\psi_{n+1} - \psi_n)$ approaches a small preselected value. Measurement of the local magnetic and gravitational field components in the instrument case-fixed frame thus provides sufficient information to determine the azimuth value.

*Measurements by the fluxgates must be made through non-magnetic material. Consequently, the drill collar 12 in the immediate vicinity of the fluxgate section 22 of the survey instrument 18 must be made of non-magnetic material. The remainder of the drill collar 12 and the drill string in general may be constructed of magnetic material, and a correct value for azimuth achieved with the foregoing method provided the effect of the magnetic material on the fluxgate measurements lies only along the longitudinal axis OZ of the survey instrument. This will be the case provided the drill string members, such as drill collars and drill pipe, which contribute to the measurable error in the fluxgate measurements, are cylindrically symmetric, for example, so that the magnetic poles of such members so interfering lie along the longitudinal axis of the sensor instrument 18.*

*The source of the field of the magnetic material of a pipe string member is distributed in an annular region which is the pipe or drill collar itself; there is no source of magnetic field along the axis of the pipe or drill collar, which is hollow. Any anisotropies in the drill string member, for example due to lack of concentricity between the inside*

*diameter and the outside diameter of the member, variation in the material density of the member, etc., may, but won't necessarily, cause the effective magnetic pole at the end of the member to be off-axis, resulting in transverse field components along the longitudinal axis of the drill string at the survey instrument. At some distance from the end of a magnetic section of drill collar or drill pipe, for example many diameters of the drill string member away, the fluxgates may nevertheless sense only a point pole along the tool axis due to the magnetic material if the transverse field due to the pipe string member is sufficiently weak to be undetectable at such distance. However, if a transverse field is generated by the drill string member, and if the drill string member is sufficiently close to the sensor instrument 18 that the fluxgates detect the transverse field, the assumption that the magnetic flux influence due to the magnetic material in the drill string lies only along the longitudinal axis of the survey instrument fails.*

*To the extent that the drill string introduces field components in a transverse direction, for example along one or both of the OX and OY axes, measurable at the fluxgates, the value of the azimuth determined by the foregoing method will be incorrect. However, the correct azimuth may be determined by eliminating the transverse field components due to the drill string from sensing by the fluxgates. This can be done by separating the magnetic material in the drill string from the fluxgates a sufficient distance so that the fluxgates cannot detect the transverse field effects generated by the magnetic material of the drill string. Such separation between the fluxgates and the magnetic material of the drill string may be achieved by lengthening the section of non-magnetic material in which the sensor instrument 18 is located. The minimum length of non-magnetic material, such as may be provided by the drill collar 12, that is necessary to prevent transverse magnetic fields from destroying the validity of the assumption that the only field effects due to the drill string lie along the longitudinal axis of the sensor instrument 18 may be calculated. The length of non-magnetic drill collar need to avoid error due to drill string interference transverse to the longitudinal axis of the survey instrument is small compared to that needed to avoid error in the longitudinal direction without the method of the present invention.*

Figure 8:
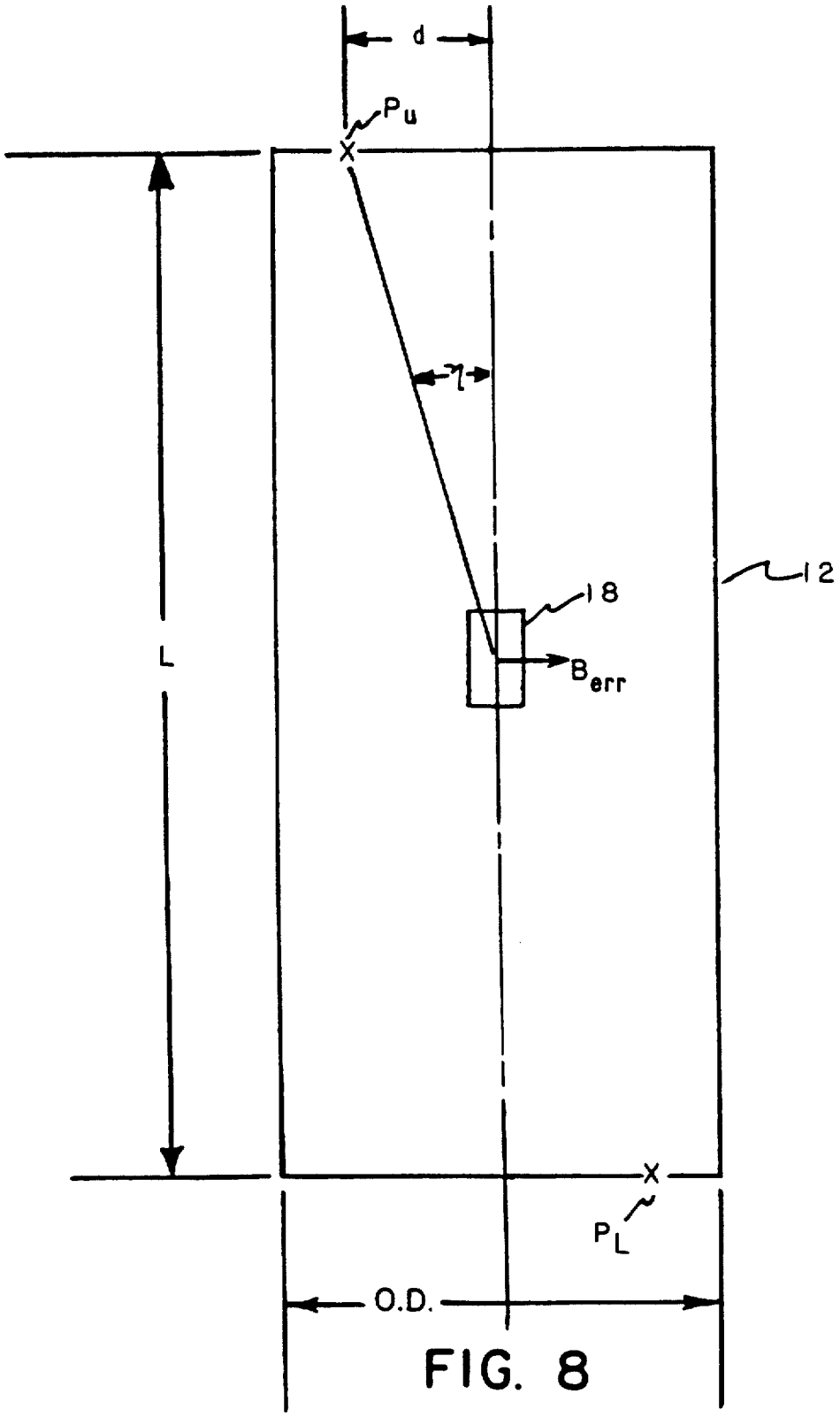
FIG. 8 is a schematic view of the survey instrument located in a drilling collar.

The length of the nonmagnetic drill collar may be determined as a function of the tolerable transverse error field $B_{err}$, as shown in FIG. 8 in which survey instrument 18 is located within the drill collar 12 having a minimum length, L, and an outer diameter, OD. The transverse field error will be created by the proximity of the magnetic material in the drill string 16 above and the drill collar or bit 10 below. The magnetic material of these two sources will create poles, $P_U$ and $P_L$, respectively. In the worst case, the poles may be assumed to be displaced from center by $$d = OD/600 \tag{14}$$

The transverse error field may be determined by $$Berr = \left[\frac{|P_U| + |P_L|}{4\pi\,(L/2)^2}\right]\sin\eta \tag{15}$$

where $\eta$ is the angle between the axis and the poles having a vertex at the survey instrument 18. Therefore:

$$[\sin\eta = d/(L/2) = 2/d/L]\ \sin\eta = d/(L/2) \tag{16}$$

The error caused in the azimuth angle in radians is determined by expanding the azimuth angle in a Taylor series as a function of the transverse field ($B_t$).

$$[\psi = \psi(B_t) = \psi(^\circ)(B_t)(B_t) + \frac{\partial\psi}{B_t}(Berr) = \psi^\circ + \partial\psi]$$

$$\psi = \psi(B_t) = \psi^\circ(B_t) + \frac{\partial\psi}{\partial B_t}(B_{err}) = \psi^\circ + \delta\psi \tag{17}$$

Therefore, the error in azimuth, $\delta\psi$, is given by $$[\delta\psi = (\psi\delta/\delta B_t)B_{err}]\ \delta\psi = (\delta\psi/\delta B_t)B_{err} \tag{18}$$

By definition, $$B_t^2 = B_T^2 - B_z^2$$

*where $B_T$ is the earth's magnetic field strength.* Therefore:

$$[B_t(\psi B_t/\delta\psi) = -B_z(\delta B_z/\delta\psi)]$$
$$B_t(\delta B_t/\delta\psi) = -B_z(\delta B_z/\delta\psi) \tag{19}$$

$B_t$ is approximately constant between about 20,000 and 60,000 $\mu$T as determined from (for example) pages 75–76 of the U.S. Geological Survey publication by E. B. Fabiano, N. W. Peddie, D. R. Barraclough and A. Zunde entitled "International Geomagnetic Reference Field 1980: Charts and Grid Values".

From Equation (12), $$\delta B_z/\delta\psi = -B_n \sin\psi \sin\theta \tag{20}$$

Using average values, $\langle B_z/B_t\rangle \approx 1$, $$\langle\sin\psi\rangle = \frac{1}{\sqrt{2}}$$

$$\langle\sin\theta\rangle = \frac{1}{\sqrt{2}}$$

then $$\delta B_t/\delta\psi = B_n/2 \tag{21}$$

By definition, $B_{err} = (\delta B_t/\delta\psi)\delta\psi$ (21)

From equation (21)

$$B_{err} = (B_n/2)\delta\psi \tag{22}$$

From Equation (16), $$\left[\frac{B_n\delta\psi}{2} = \left[\frac{|P_U| + |P_L|\,(d)}{4\pi(L/2)^3}\right]\right] \tag{23}$$

$$\frac{B_n\delta\psi}{2} = \left[\frac{(|P_U| + |P_L|)\,(d)}{4\pi(L/2)^3}\right] \tag{23}$$

Solving equation (23) for L, $$L = 2\left[\frac{(|P_U| + |P_L|)\,2d}{4\pi\,B_n\,\delta\psi}\right]^{\frac{1}{3}} \tag{24}$$

For [$|P_U| + |_L| = 2000$ micro Webers] $|P_U| + |P_L| = 2000$ *micro Webers* and a collar having an outer diameter of $7\frac{1}{2}''$, d, from equation (14), equals 0.013 in. Equation (14) may vary slightly with configuration of collar.

For an acceptable error in azimuth angle, $\psi$, of 0.25 degrees in the Gulf Coast, the minimum nonmagnetic collar length is L = 6.4 ft.

Figure 7:
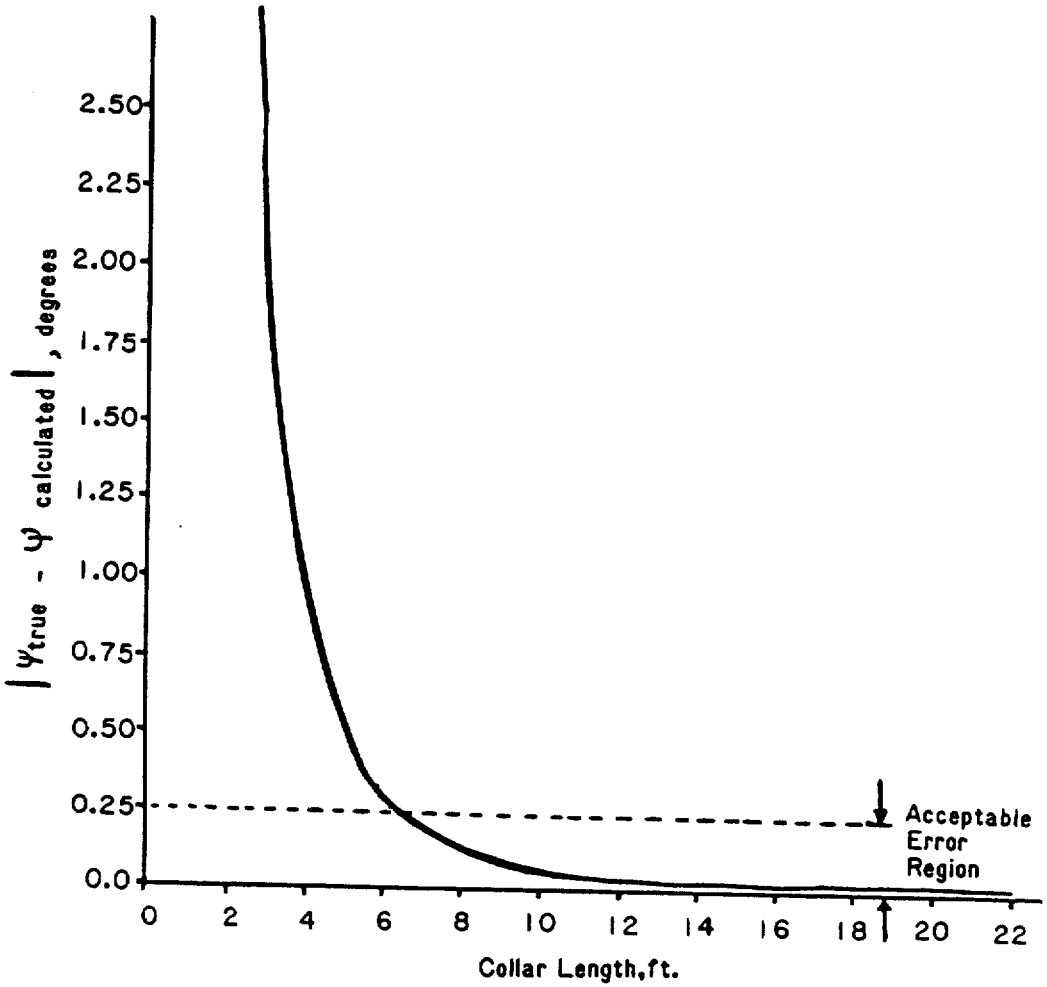
FIG. 7 illustrates typical error in calculated azimuth as a function of collar length for the Gulf Coast region.

FIG. 7 illustrates the error incurred in the calculation of azimuth angle as a function of collar length, L, for $B_n$ equals 25 micro Tesla, a value for the Gulf Coast region. As the length of non-magnetic collar is increased, the extraneous transverse magnetic field strength is reduced and the calculated azimuth approaches the true azimuth.

Therefore a minimum L of between about 5 to 7 feet will result in a calculated azimuth angle falling within the acceptable error region of FIG. 7 for the Gulf Coast. Other collar lengths will be calculated accordingly for different regions, collar configuration and outside diameter.

Using this determination, a system of this invention for determining the orientation of a downhole instrument in a borehole would comprise a means for determining inclination angle of the instrument at a location thereof in said borehole; a means for determining the highside angle of said instrument at said location; [a means for determining the true horizontal and vertical components of the earth's magnetic field at the location of the borehole;] a means for determining components of the local magnetic field perpendicular to the direction of a primary axis of the instrument aligned with the borehole at said location, said drill collar being constructed of non-magnetic material, and having a minimum length, L, determined as follows:

$$[L = 2\left[\frac{|P_U| + |P_L|\,(2d)}{2\pi\, B_n\, \delta\psi}\right]^{\frac{1}{2}}]$$

$$L = 2\left[\frac{(|P_U| + |P_L|)\,2d}{4\pi B_n\, \delta\psi}\right]^{\frac{1}{2}}$$

Numerous variations and modifications may obviously be made in the apparatus herein described without departing from the present invention. Accordingly, it should be clearly understood that the forms of the invention described herein and shown in the figures of the accompanying drawings are illustrative only and are not intended to limit the scope of the invention.

What is claimed is:

[1. A system for determining the orientation of a downhole instrument positioned in a drill collar in a borehole comprising: a means for determining inclination angle of the instrument at a location thereof in said borehole; a means for determining the highside angle of said instrument at said location; a means for determining the true horizontal and vertical components of the earth's magnetic field at the location of the borehole; a means for determining components of the local magnetic field perpendicular to the direction of a primary axis of the instrument aligned with the borehole at said location, said drill collar being constructed of non-magnetic material, and having a minimum length, L, determined from the equation:

$$L = 2\left[\frac{(|Pu| + |PL|)2d}{4\pi\, Bn\, \delta\psi}\right]^{\frac{1}{2}}$$

where $P_u$ is the magnetic pole created by the magnetic material above the sensor, $P_L$ is the magnetic pole created by the magnetic material below the sensor, d is the displacement of the poles $P_u$ and $P_L$ from the axis of the instrument, $B_n$ is the North component of the earth's magnetic field at the tinstrument, and $\delta\psi$ is the error in the azimuth angle.]

[2. The orientation system of claim 1 wherein said means for determining the components of local magnetic field comprises a means for sensing measured components of said local magnetic field, said sensing means being located at least one third of said length of said drill collar from an end of said drill collar.]

[3. The orientation system of claim 1 wherein said instrument is located in a drill string extending in said borehole, said system being located between the lower drill string end connecting to the drill bit and an upper drill string end connecting to the surface.]

[4. The orientation system of claim 3 wherein said drill string is comprised of magnetic material.]

*5. A method of determining the orientation of a surveying instrument in a borehole comprising the steps of:*

*a. determining the inclination angle of the instrument in the borehole;*

*b. determining highside angle of the instrument in the borehole;*

*c. determining two transverse components of the local magnetic field perpendicular to the longitudinal axis of said instrument in the borehole;*

*d. determining, without directly measuring, a value for the component of the local magnetic field along the longitudinal axis of the instrument in the borehole utilizing the inclination angle; and*

*e. determining a value of azimuth angle of the instrument utilizing the local magnetic field components, the inclination angle and the highside angle, and without utilizing a directly measured value for the local magnetic field component along the longitudinal axis of said instrument.*

*6. A method as defined in claim 5 further comprising:*

*a. providing data indicative of the earth's magnetic field at said borehole; and*

*b. using said earth's magnetic field data in the step of determining a value for the component of the local magnetic field along the longitudinal axis of the instrument in the borehole.*

*7. A method as defined in claim 6 further comprising:*

*a. utilizing the inclination angle, the highside angle, earth's magnetic field data and said transverse components of the local magnetic field perpendicular to the longitudinal axis of the instrument to obtain an approximate value of azimuth angle;*

*b. using the approximate value of the azimuth angle also in determining the value for the component of the local magnetic field along the longitudinal axis of the instrument in the borehole; and*

*c. so determining a more accurate value for azimuth angle.*

*8. A method as defined in claim 7 comprising the additional steps of using such more accurate value of azimuth angle as an approximate value of azimuth angle to determine a further value for the component of the local mag-*

*netic field along the longitudinal axis of the instrument in the borehole, and determining a new more accurate value of azimuth angle using said further value for the component of the local magnetic field along the longitudinal axis of the instrument as in claim 7.*

*9. A method as defined in claim 8 comprising the additional steps of repeating the steps of claim 8 until the obtained values of azimuth angle converge to within an acceptable error.*

*10. A method as defined in claim 6 wherein the earth's magnetic field data is determined by utilizing sensing means included in such a surveying instrument.*

*11. A method as defined in claim 6 wherein the earth's magnetic field data is determined at the surface of the earth in the vicinity of said borehole.*

*12. A method as defined in claim 6 wherein the earth's magnetic field data is determined in terms of horizontal and vertical components of said field.*

*13. A method as defined in claim 5 wherein said instrument is provided located in a drill string in said borehole, said instrument being located between the lower drill string end connecting to a drill bit and an upper drill string end connecting to the surface.*

*14. A method as defined in claim 5 further including providing said surveying instrument positioned in non-magnetic material having a length no shorter than a length L determined by the equation:*

$$L = 2\left[\frac{(|P_U| + |P_L|)\,2d}{4\pi B_n\,\delta\psi}\right]^{\frac{1}{3}}$$

*where $P_U$ is the magnetic pole of magnetic material above said non-magnetic material, $P_L$ is the magnetic pole of magnetic material below said non-magnetic material, d is the displacement of the poles $P_U$ and $P_L$ from the axis of the instrument, $B_n$ is the north component of the earth's magnetic field at the borehole, and $\delta\psi$ is an acceptable error in the azimuth angle.*

*15. A method as defined in claim 14 wherein the transverse components of the local magnetic field are determined by utilizing sensing means included in such a surveying instrument and located at least one third of said length of said non-magnetic material from an end of said non-magnetic material.*

*16. A method of determining the orientation of a surveying instrument in a borehole, comprising the steps of:*

*a. determining the inclination angle of the instrument in the borehole;*

*b. determining the highside angle of the instrument in the borehole;*

*c. providing data indicative of the earth's magnetic field at the borehole;*

*d. determining two transverse components of the local magnetic field perpendicular to the longitudinal axis of the instrument in the borehole;*

*e. calculating, without directly measuring, a value for the component of the local magnetic field along the longitudinal axis of the instrument in the borehole utilizing the earth's magnetic field data; and*

*f. determining a value for the azimuth angle of the instrument utilizing said local magnetic field components, the inclination angle and the highside angle, and without utilizing a directly measured value for the local magnetic field component along the longitudinal axis of the instrument in the borehole.*

*17. A method according to claim 16 wherein said value for the component of the local magnetic field along the longitudinal axis of the instrument is determined also utilizing the inclination angle and an approximation of the azimuth angle of the instrument.*

*18. A method according to claim 17 wherein the approximation of the azimuth angle of the instrument is determined from the inclination angle, the highside angle, the transverse components of the local magnetic field perpendicular to the longitudinal axis of the instrument, and earth's magnetic field data.*

*19. A method according to claim 17 comprising the additional steps of determining a further value for the component of the local magnetic field along the longitudinal axis of the instrument utilizing the previously determined value for the azimuth angle, and determining a new, more accurate value for the azimuth angle utilizing said further value for the component of the local magnetic field along the longitudinal axis of the instrument.*

*20. A method according to claim 19 comprising the additional steps of repeating the steps of claim 19 until the obtained values of azimuth angle converge to within an acceptable error.*

*21. A method according to claim 16 which comprises:*

*a. utilizing the inclination angle, the highside angle, earth's magnetic field data and the transverse components of the local magnetic field perpendicular to the longitudinal axis of the instrument to obtain an approximate value of the azimuth angle for the instrument;*

*b. utilizing the inclination angle and said approximate value for the azimuth angle also in determining said value for the component of the local magnetic field along the longitudinal axis of the instrument; and*

*c. so determining a more accurate value for the azimuth angle.*

*22. A method according to claim 21 comprising the additional steps of utilizing such more accurate value for the azimuth angle as an approximate value for the azimuth angle to determine a further value for the component of the local magnetic field along the longitudinal axis of the instrument, and determining a new, more accurate value for the azimuth angle using said further value for the component of the local magnetic field along the longitudinal axis of the instrument as in claim 21.*

*23. A method according to claim 22 comprising the additional steps of repeating the steps of claim 22 until the obtained values of azimuth angle coverage to within an acceptable error.*

*24. A method according to claim 16 wherein the local magnetic field components are determined by utilizing sensing means included in such a surveying instrument.*

*25. A method according to claim 16 wherein the earth's magnetic field data is determined by utilizing sensing means included in such a survey instrument.*

*26. A method according to claim 16 wherein the earth's magnetic field data is determined at the surface of the earth in the vicinity of said borehole.*

*27. A method according to claim 16 wherein said instrument is provided located in a drill string in said borehole, said instrument being located between a lower drill string end connecting to a drill bit and an upper drill string end connecting to the surface.*

*28. Apparatus for determining the orientation of a surveying instrument in a borehole, comprising:*

*a. means for determining the inclination angle for the instrument in the borehole;*

*b. means for determining the highside angle of the instrument in the borehole;*

*c. means for storing data indicative of the earth's magnetic field at the borehole;*

*d. means for determining two transverse components of the local magnetic field perpendicular to the longitudinal axis of the instrument in the borehole;*

*e. first calculating means for calculating, without directly measuring, a value for the component of the local magnetic field along the longitudinal axis of the instrument in the borehole utilizing the earth's magnetic field data; and*

*f. second calculating means for calculating a value for the azimuth angle of the instrument utilizing said local magnetic field components, the inclination angle and the highside angle, and without utilizing a directly measured value for the local magnetic field component along the longitudinal axis for the instrument in the borehole.*

* * * * *